Nov. 22, 1932.  N. M. FAULDS  1,888,528
APPARATUS FOR EXTRACTING AND COLLECTING FRUIT JUICE
Filed Aug. 13, 1930  4 Sheets-Sheet 4
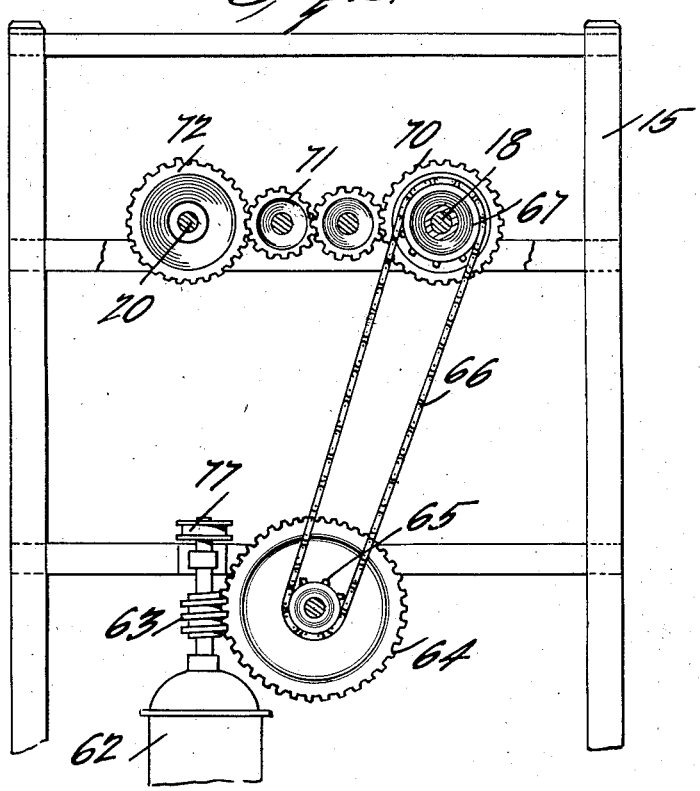
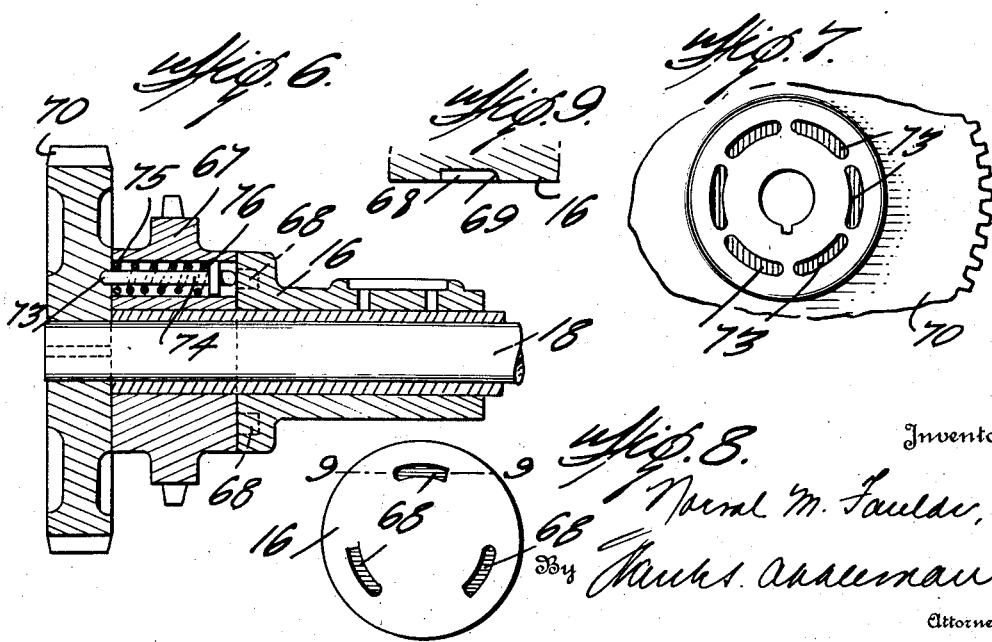

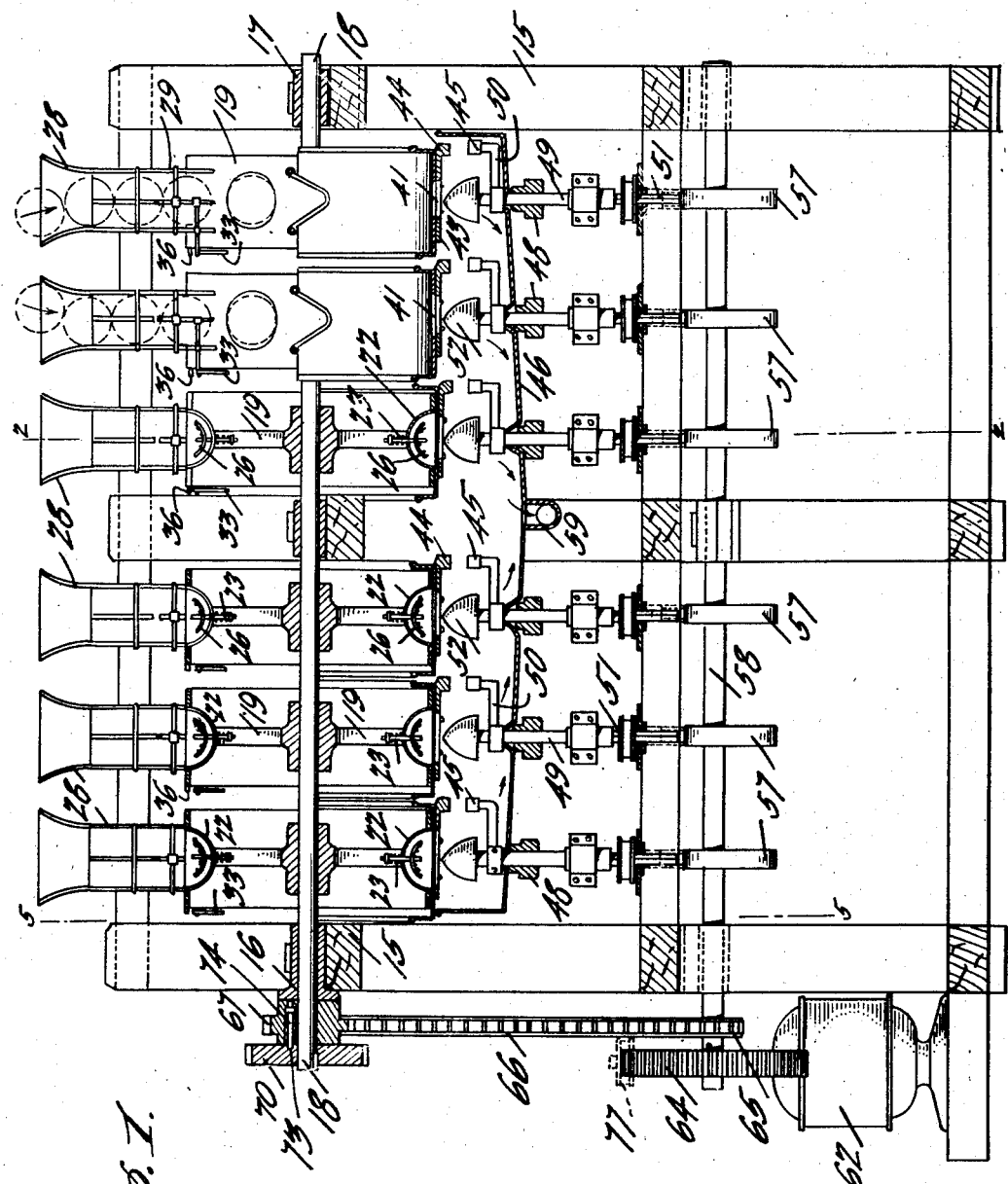

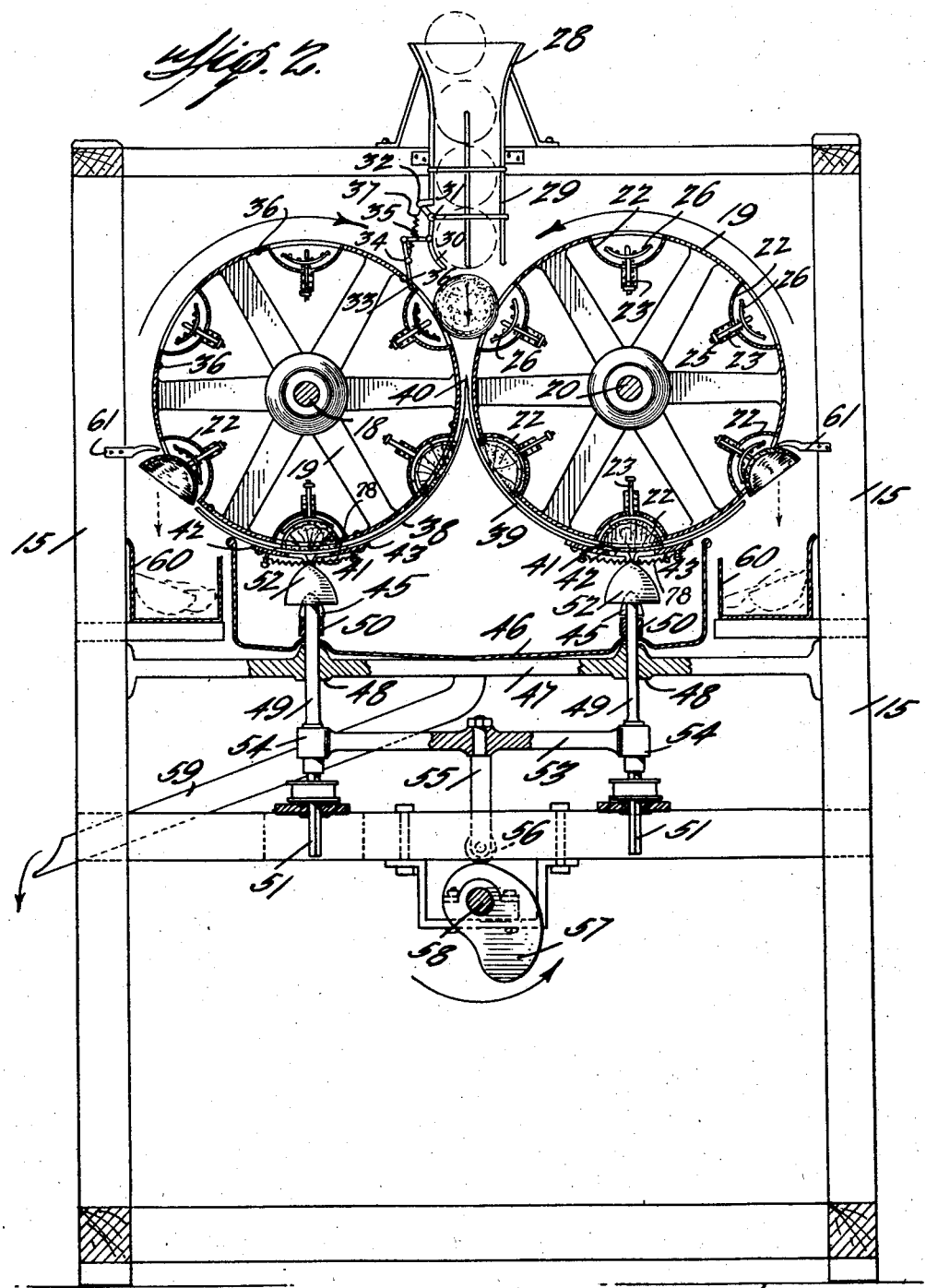

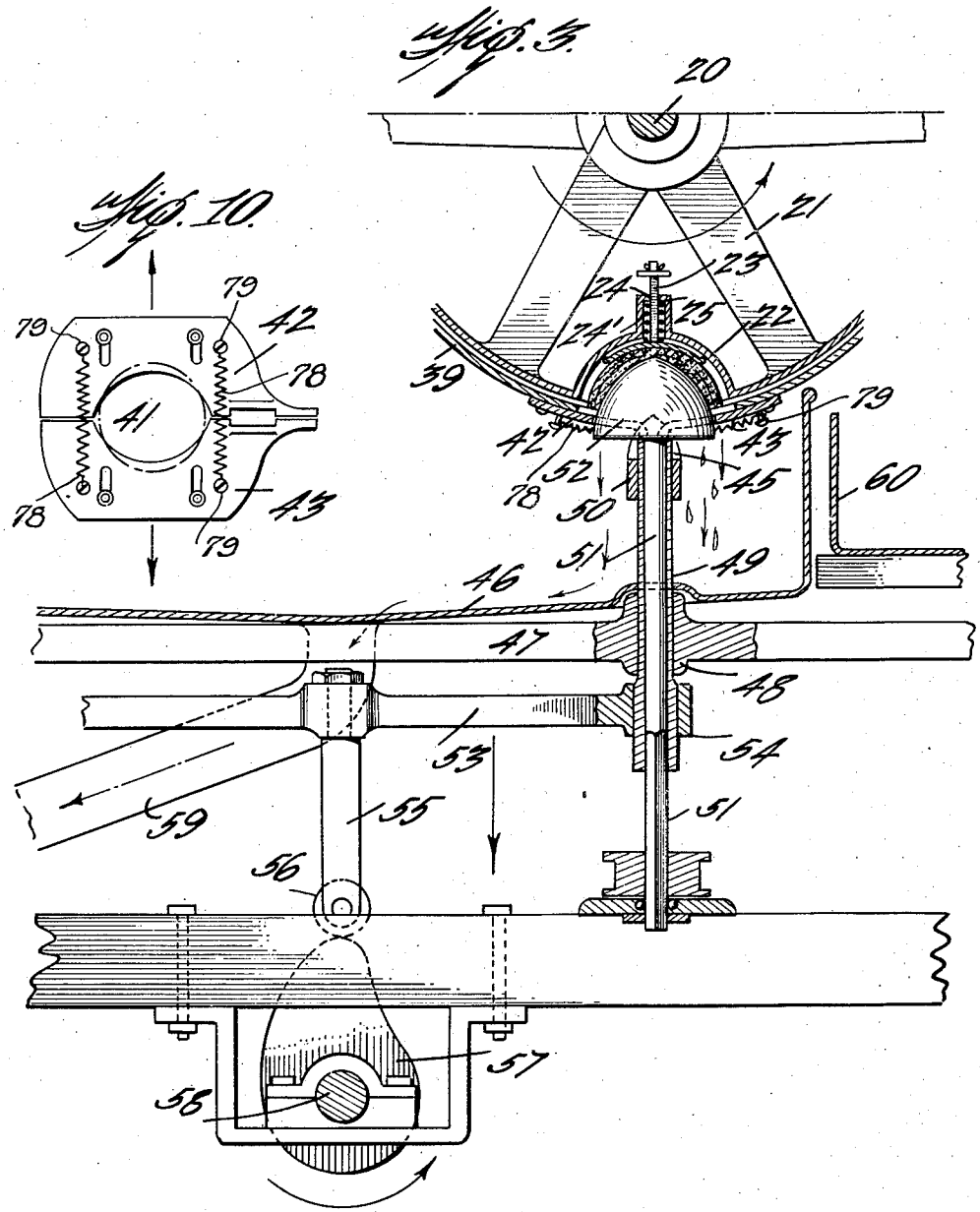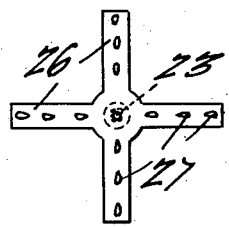

Patented Nov. 22, 1932

1,888,528

UNITED STATES PATENT OFFICE

NORVAL M. FAULDS, OF CLEARWATER, FLORIDA

APPARATUS FOR EXTRACTING AND COLLECTING FRUIT JUICE

Application filed August 13, 1930. Serial No. 475,112.

This invention relates to apparatus for extracting and collecting fruit juices and an object of this invention is to provide novel means for holding fruit and carrying it into the zone of action of a splitting device, such as a knife or the like, and thereafter exerting pressure on the contents of the sections to extract juice therefrom while, at the same time, subjecting each section to the action of a rotary member which dislodges the juice and pulp.

It is a further object of this invention to provide novel means for holding the fruit against rotary motion while being cut and while the juice is being extracted therefrom, means being also provided for ejecting the fruit from the carrier after it has been subjected to the aforesaid operations.

A further object of this invention is to provide a fruit juice extractor in which the fruit is treated wholly by mechanical means, the parts of which are operated in time with other parts to effect a synchronous operation of the instrumentalities employed.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 illustrates a view in elevation of parts of the apparatus, other parts being in section;

Figure 2 illustrates a sectional view of the apparatus at right angles to that shown in Figure 1;

Figure 3 illustrates an enlarged detail view of a fruit holder and the means for extracting juice therefrom;

Figure 4 illustrates a plan view of one of the fruit holding elements;

Figure 5 illustrates a detail view of the driving mechanism;

Figure 6 illustrates a sectional view of a part of the intermittent drive;

Figure 7 illustrates a face view of one of the elements of the intermittent drive;

Figure 8 illustrates a face view of another element thereof;

Figure 9 illustrates a sectional view on the line 9—9 of Figure 8; and

Figure 10 illustrates a plan view of fruit retaining shutters.

In these drawings 15 denotes a suitable frame having journal bearings 16 and 17 for a shaft 18, which shaft is intended to carry one or a plurality of wheels 19. The frame is also provided with bearings similar to the bearings 16 and 17 for a shaft 20 on which is mounted one or a plurality of wheels 21, each of the wheels 19 being adapted to coact with a wheel 21, and the wheels are mounted so that their peripheries travel in close contact with one another as said wheels are rotated in clockwise and anticlockwise directions respectively, as will presently appear.

Each of the wheels has a plurality of peripheral cups or seats 22 larger than one half of any of the fruit which the wheels are intended to carry and each cup is provided with a fruit holding or grasping element comprising a rod 23 which is slidably mounted radially of the wheel. The rod is preferably square and it is movable radially in a square aperture 24 in order that it will be prevented from rotating while moving radially of the wheel. Each rod is held normally projected toward the periphery of the wheel by a spring 24' which encircles a portion of the rod and bears against a shoulder 25 on the rod and fingers 26 which are carried by the rod. The fingers are preferably resilient and they are curved to engage the outer surface of the fruit which is delivered to the cup in which the fingers are seated and preferably the fingers have spurs or projections 27 which embed themselves in the skin of the fruit in order that the fruit may be held anchored while the juice is being extracted, as will presently appear.

In the present embodiment of the invention, a hopper 28 is located above the wheels and in position to deliver fruit between the wheels as they rotate. The hopper has a chute 29 with a fruit arresting and releasing device timed to release fruit when the corelated cups of the wheels are in position to receive it. As a means for delivering fruit successively, the chute is provided at its lower end with a gate 30 hinged at 31 to swing outwardly. The gate is curved and restricts the exit of the chute so that the fruit can not escape until the gate is swung outwardly to unguard the discharge opening. The gate also operates in conjunction with a fruit arresting device 32 whose angularly extending arm is carried inwardly when the gate swings outwardly. The arm is integral with the gate or connected to its pivot for the purpose mentioned. The gate is operated by a lever 33 mounted on a pivot 34 and connected by a link 35 to the gate. The end of the lever remote from the link is moved on the pivot by pins 36 on the wheels striking the said lever as the pins pass the zone occupied by the lever. The gate is held normally closed by a spring 37 connected to the arm 32 and anchored to the pivot of the lever.

Breast plates 38 and 39 are supported in positions concentric with the peripheries of the wheels and they converge between the wheels and support a slicer or knife 40 into engagement with which the fruit is carried by the coacting wheels. While this knife may be stationary as illustrated, the inventor does not wish to be limited with respect to the manner of cutting the fruit in half as that may be done by a knife mechanically operated or otherwise. The breast plates serve to hold the severed halves of the fruit in their respective cups until the juice extracting instrumentalities have operated. The breast plates each have an aperture 41 guarded by spring-held shutters 42 and 43 and each shutter has a depending lug such as 44. The lug of one shutter is in proximity to the lug of the other shutter and they are engaged by a wedge 45 which is forced between them to cause the separation of one shutter from the other when the fruit reaches a predetermined location during the rotation of the wheels.

The apparatus includes a pressing and reaming device adapted to operate on the fruit as it successively reaches a predetermined position, that is to say, when it is located over the opening in the breast plates above the shutters.

A juice collecting pan 46 is located under the wheels and the pan is supported by a plurality of bars 47 having guiding bearings 48, one such guiding bearing being located below the opening in each breast plate. A sleeve 49 is movable vertically in each bearing and each sleeve has an arm 50 attached to it that supports a wedge 45. A shaft 51 is rotatable in each sleeve and a juice extracting head or burr 52 is supplied for each shaft.

In the present embodiment of the invention a sleeve and shaft is carried on each end of a bar 53 and each shaft rotates in a bearing 54 at the end of the bar. A rod 55 extends downwardly from the center of the bar to which it is connected and a wheel 56 is journaled in the lower end of the rod, said wheel being in engagement with the cam 57 mounted on the shaft 58 which, when rotated, causes the bar 53 to be raised and lowered. It will be seen from an inspection of the drawings that when the bar is raised, the sleeves and shafts of the juice extracting heads or burrs will be forced upwardly carrying the heads or burrs through the openings of the breast plates into engagement with the fruit carried in the cups of the wheels. The juice so extracted falls into the collecting pan and may be removed therefrom at any convenient location or in any desired manner, as by a spout 59.

The shafts 51 are rotated in unison by appropriate means such as those skilled in the art will understand.

Collecting troughs or receptacles 60 may be provided at the sides of the frame into which the skins of the fruit will be deposited. Generally speaking, the skins will be ejected by the action of the spring projected fingers but in order to insure dislodgement of the skins, an arm 61 may be secured to the frame at each side and their ends will be positioned to engage skins of fruit should they not be wholly dislodged through the action of the spring pressed fingers.

The shafts 18 for rotating the wheels are intermittently driven from a motor 62 having a worm 63 engaging a toothed wheel 64, a sprocket wheel 65 and a sprocket chain 66 which sprocket chain operates over a sprocket wheel 67 which idles on the shaft 18.

The end or face of the bearing 16 is provided with curved recesses 68, the end wall of each of which is shaped to form a cam 69. A gear wheel 70 is keyed on the shaft 18 and it drives a train of gears 71 which, in turn, drives a gear wheel 72 on the shaft 20, the train of gears being interposed for the purpose of driving the shafts 18 and 20 in opposite directions. The inner face of the gear wheel 70 is provided with a plurality of curved slots 73. A pin 74 is movable in a seat which extends longitudinally of the hub of the wheel 67 and its ends may alternately project at opposite ends of the seat to enter the recesses 68 or the recesses 73 as will presently appear. A spring 75 bears against a shoulder 76 of the pin and the face of the wheel 75 and acts to project the pin normally toward the bearing 16 to force the end of the pin into a recess 68 when the pin registers with a recess, the said pin being moved axially again against action of the spring by a cam 69 at the end of a recess 68. While the end of the pin is riding on the face of the bearing, the opposite end of the pin will be forced into one of the slots 73 and by this means the pin will be alternately reciprocated, and the mechanism will be driven intermittently to rotate the wheels to cause the arresting of said wheels and in time therewith the operation of the juice extracting instrumentalities.

The shaft of the worm 63 has a pulley 77 which may be belted to the pulleys on the juice extracting shafts.

As the pairs of wheels revolve, in the present apparatus, they are turned one-sixth of a revolution and are at rest for an equal period of time as the pin 74 carried by the gear wheel 67 alternately couples the gear wheel 67 to the gear wheel 70 and releases it through the means described. When the fruit carrying wheels are at rest, the driven mechanism elevates the fruit juice extracting pressers and burrs and when they have operated a predetermined time, they are allowed to descent out of the zone of action of the fruit and the wheels are again moved one-sixth of a revolution. The arrangement of parts is such that the juice extracting device is driven continuously during the operation of the machine.

I claim:

1. In a fruit juice extracting machine, pairs of wheels having coinciding peripheral fruit receiving cups, means for delivering fruit to the cups successively, means for intermittently partially rotating the wheels in unison and in opposite directions, means for cutting the fruit as it is carried by the wheels, means for holding the cut fruit in the cups while the wheels are moving, the said means each having an opening at a fixed location, movable means at such locations for temporarily guarding the opening and preventing dislodgment of the fruit, juice extracting means movable into cooperative relation with the fruit at the opening, means for uncovering the opening for the admission of the juice extracting means, and means for operating the juice extracting means.

2. In a fruit juice extracting machine, pairs of wheels having coinciding peripheral fruit receiving cups, means for delivering fruit to the cups successively, elements projectable radially in the cups, fruit engaging fingers on said elements, means for intermittently partially rotating the wheels in unison and in opposite directions, means for cutting the fruit as it is carried by the wheels, means for holding the cut fruit in the cups while the wheels are moving, the said means each having an opening at a fixed location, movable means at such locations for temporarily guarding the opening and preventing the dislodgment of the fruit, juice extracting means movable into cooperative relation with the fruit at the opening, means for uncovering the opening for the admission of the juice extracting means, and means for operating the juice extracting means.

3. In a fruit juice extracting machine, pairs of wheels having coinciding peripheral fruit receiving cups, means for delivering fruit to the cups successively, elements projectable radially in the cups, resilient fruit engaging fingers on said elements with projections on said fingers adapted to be embedded in the skin of the fruit, means for intermittently partially rotating the wheels in unison and in opposite directions, means for cutting the fruit as it is carried by the wheels, means for holding the cut fruit in the cups while the wheels are moving, the same means each having an opening at a fixed location, movable means at such locations for temporarily guarding the opening and preventing dislodgment of the fruit, juice extracting means movable into cooperative relation with the fruit at the opening, means for uncovering the opening for the admission of the juice extracting means, and means for operating the juice extracting means.

4. In a fruit juice extracting machine, pairs of wheels having coinciding peripheral fruit receiving cups, means in the cups for holding the fruit against movement, means for intermittently partially rotating the wheel in unison and in opposite directions, means for cutting the fruit, means for holding the cut fruit in the cups while the wheels are moving, said fruit holding means, each having an opening, movable means at such openings for temporarily guarding the openings and preventing dislodgment of the fruit, juice extracting means movable into cooperative relation with the fruit at the opening, and means for uncovering the opening for the admission of the juice extracting means.

5. In a fruit juice extracting means, a wheel having peripheral recesses adapted to carry one half of a whole fruit, a curved plate concentric with the wheel for retaining the fruit in the recesses, yieldable means guarding the fruit when in position for extracting its juice, a fruit juice extracting member movable into and out of engagement with fruit in the successive recesses, the said extracting members being operative to displace the yieldable means for exposing the fruit to the action of said juice extracting means, and means for operating the juice extracting means.

NORVAL M. FAULDS.